June 16, 1936.    M. KRAUT    2,044,250
APPARATUS FOR RECOVERING VALUES FROM ORE PULP
Filed Jan. 11, 1933    4 Sheets-Sheet 1
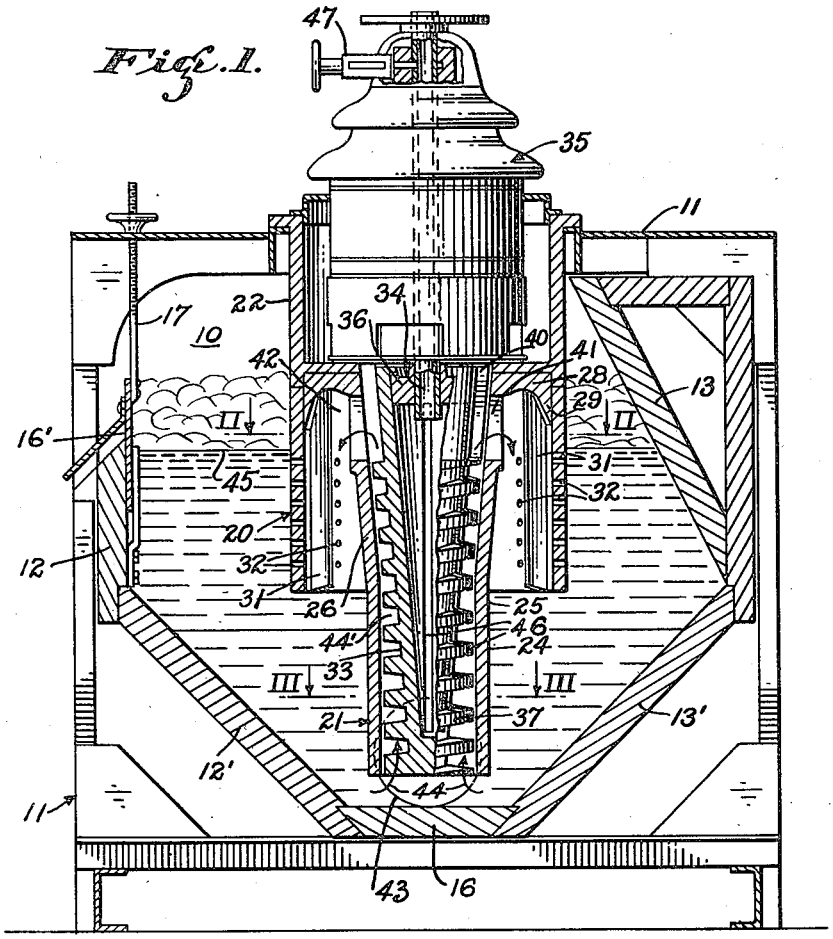
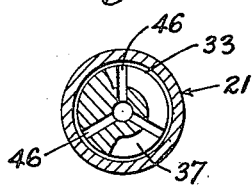
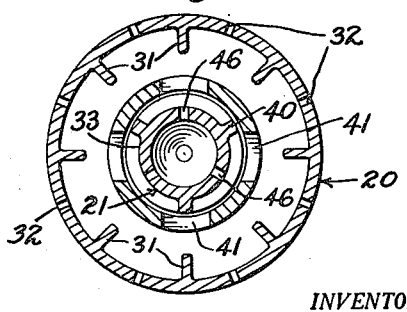
INVENTOR.
Max Kraut
BY
ATTORNEY.

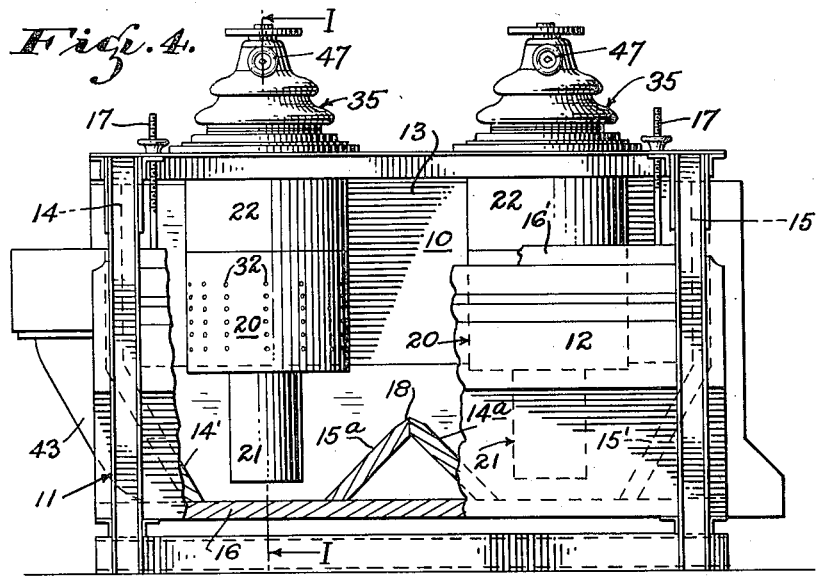
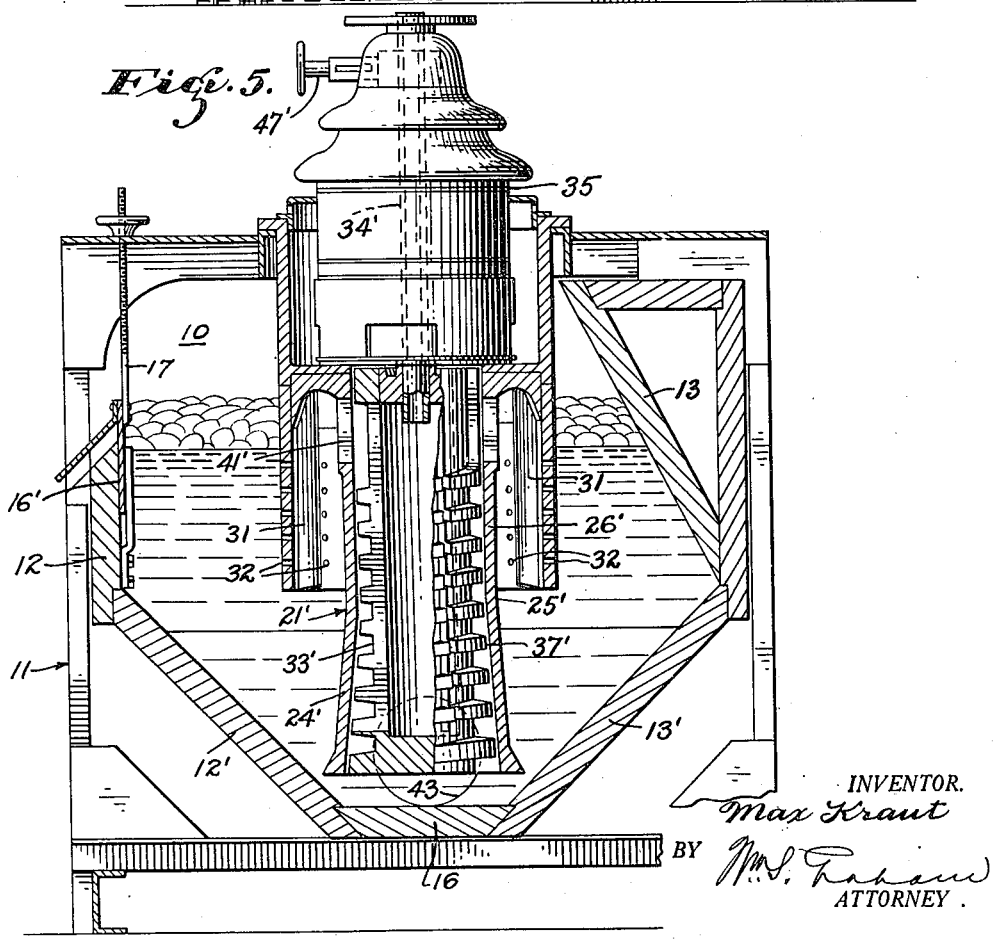

June 16, 1936.  M. KRAUT  2,044,250
APPARATUS FOR RECOVERING VALUES FROM ORE PULP
Filed Jan. 11, 1933  4 Sheets-Sheet 3
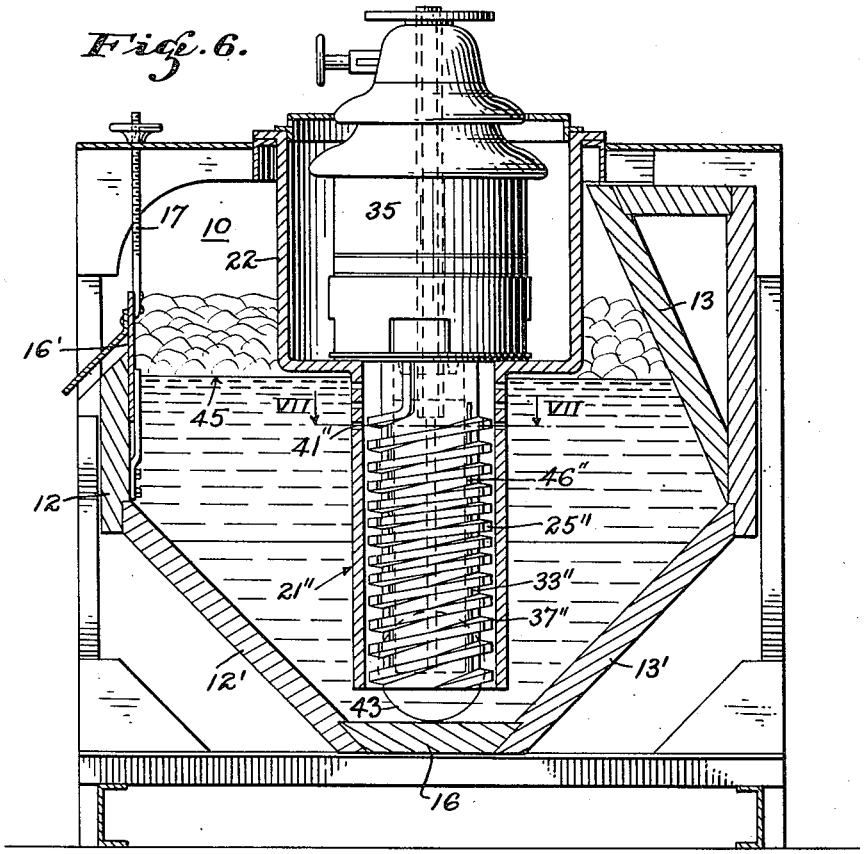
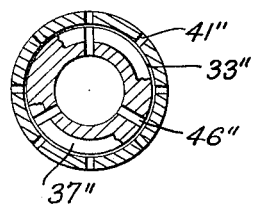
INVENTOR.
Max Kraut.
BY
ATTORNEY.

June 16, 1936.  M. KRAUT  2,044,250
APPARATUS FOR RECOVERING VALUES FROM ORE PULP
Filed Jan. 11, 1933  4 Sheets-Sheet 4
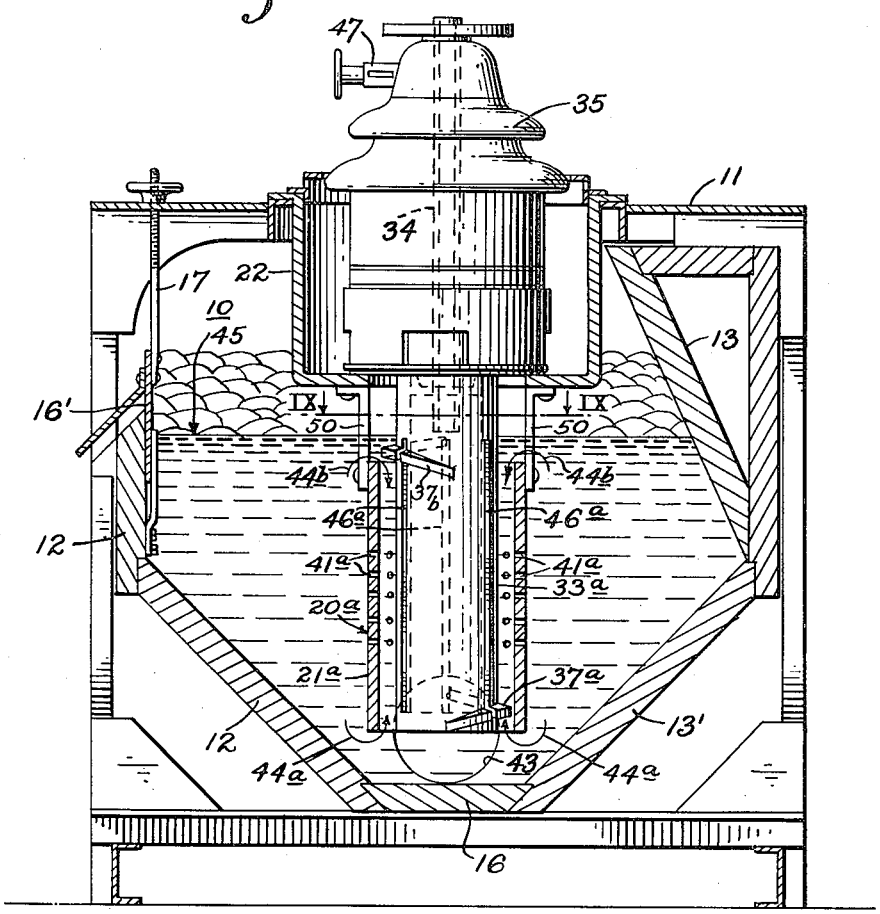
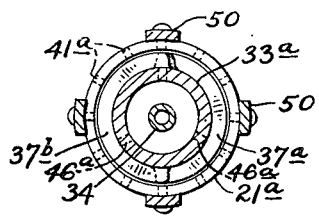
INVENTOR.
Max Kraut.
BY
ATTORNEY Patented June 16, 1936

2,044,250

UNITED STATES PATENT OFFICE 2,044,250

APPARATUS FOR RECOVERING VALUES FROM ORE PULP

Max Kraut, San Francisco, Calif., assignor to Pan-American Engineering Corporation, Ltd., San Francisco, Calif., a corporation of California Application January 11, 1933, Serial No. 651,175

7 Claims. (Cl. 261—93)

This invention relates to the recovering of values from ore pulp, and more particularly to an improved apparatus for selectively recovering minerals from ore pulp containing a complexity of minerals.

It is one object of this invention to provide an improved apparatus for selectively recovering minerals from ore pulp containing a complexity of minerals.

Another object is to provide an apparatus for treating ore pulp containing a complexity of minerals, whereby the minerals may be selectively recovered from the ore pulp, without the use of reagents in some instances.

Another object is to provide a novel apparatus for treating ore pulp for selectively recovering minerals therefrom, which shall expand a flowing column of pulp and induce air into the pulp to aerate the pulp, and which will subject the aerated pulp during some portion of the flow to a squeezing action so as to increase its velocity at such portion and thereby enhance division of the induced air into extremely fine particles.

Another object is to provide in an apparatus for selectively recovering minerals from ore pulp, novel means for inducing a cycle of flow of the ore pulp being treated, and subjecting the pulp during such flow to expansion or in other words to the action of a partial vacuum.

A further object is to provide in an apparatus having the above characteristics, novel means for aerating and expanding the ore pulp being treated.

A still further object is to provide an apparatus having the above characteristics, that shall be simple in structure, durable, efficient in operation and comparatively cheap to manufacture.

The above and other objects will be made apparent throughout the further description of the invention when taken in connection with the accompanying drawings, wherein like reference characters refer to like parts. It is to be distinctly understood that the drawings are not a definition of the invention, but are merely certain forms of an apparatus for carrying out the invention, the scope of the invention being defined by the appended claims.

In the drawings:

Fig. 1 is a vertical transverse sectional view taken on the line I—I of Fig. 4, showing a preferred exemplification.

Fig. 2 is a sectional view taken on the line II—II of Fig. 1.

Fig. 3 is a sectional view taken on the line III—III of Fig. 1.

Fig. 4 is a front elevational view, having a portion broken away, of Fig. 1.

Fig. 5 is a view similar to Fig. 1, illustrating another embodiment of the invention.

Fig. 6 is a transverse vertical section similar to Figs. 1 and 5, of still another embodiment of the invention.

Fig. 7 is a sectional view, taken on the line VII—VII of Fig. 6.

Fig. 8 is a vertical transverse sectional view similar to Fig. 1, of another embodiment of the invention, and Fig. 9 is a sectional view taken on line IX—IX of Fig. 8.

In the preferred form exemplified by Fig. 1, the apparatus comprises a flotation chamber, represented in its entirety by 10, adapted to contain the ore pulp, (prepared in the usual manner) to be treated. The chamber 10 may be mounted with a vertical axis and be of any desired shape, and built in or mounted in a suitable supporting structure, represented in its entirety by 11. The chamber 10 is provided with a front wall 12, rear wall 13 and end walls 14 and 15. The rear wall 13 is preferably inclined inwardly towards the center of the chamber for directing the pulp being treated towards the front wall 12 and an overflow gate 16'. The walls 12, 13, 14 and 15 are each connected to a bottom 16 by downwardly and inwardly inclined walls 12', 14' and 15', respectively. The upper end of the front wall 12 terminates at an intermediate portion of the chamber 10, and is provided with the gate 16', the latter having means, as shown at 17, for raising and lowering the gate 16', whereby the level of the substance contained within the chamber 10 may be raised or lowered as desired.

The lower portion of the chamber 10 may be divided into a plurality of sections by disposing therein one or more transverse inverted V-shaped partitions, represented in its entirety by 18; the partitions 18 having side walls 14ª and 15ª for forming a plurality of reduced bottom portions within the chamber, so that a plurality of pulp treating units may be operated in a single elongated tank or chamber 10, and each unit having a zone with a reduced bottom portion, as shown in Fig. 4.

Disposed within the chamber 10 and suspended vertically from the top of the framework 11 is a novel means, represented in its entirety by 20, for treating the ore pulp for selectively recovering minerals therefrom. The means 20 comprises a stationary hollow shell or stator represented in its entirety by 21; the latter being supported at its upper end by a framework 22, and having its lower end terminating adjacent the bottom 16 of the chamber and in a zone of cooperating reduced portion of chamber 10 formed by the inclined walls 12', 13', 14', 15' and 14ª and 15ª, which forms a pool of pulp at the open bottom of shell 21. The shell 21 as illustrated in Figs. 1 to 4 inclusive is provided with a cylindrical portion 24 which extends from the bottom thereof to substantially the intermediate portion 25.

The upper portion of the shell 21 is flared radially outwardly and upwardly from the portion 25 in the form of an inverted frustum of a cone, as shown at 26, and forms a venturi at substantially an intermediate portion of the shell 21. The upper end of the portion 26 of the shell 21 terminates in or is provided with an outwardly extending annular flange 28 radial to the shell 21; the latter being fixed to and supported by the framework 22. The periphery of the flange 28 is provided with a downwardly extending annular skirt 29. The skirt 29 is provided about its inner circumference with a plurality of radially inwardly extending vertical flanges 31, and is perforated about its circumference, as shown at openings 32. The purpose of the flanges 31 and perforations 32 will later be described.

Positioned within the stator or shell 21 is a centrally hollow rotor, represented in its entirety by 33, the core of which is shown as conical in the preferred exemplification of Fig. 1; the cone taper of the core above the intermediate point 25 of the shell being substantially parallel with the inner wall of the shell. The upper end of the rotor 33 is rigidly fixed to and turnable with a tubular motor shaft 34 of a motor 35, by means of a sleeve 36. The rotor 33 is a vertical conveyer and is provided on its outer surfaces with a helical screw in the form of helical screw flights or ribs 37, which rotate with their outer edges or crest faces in close proximity to the inner wall of shell or stator 21, providing a passageway within which the pulp is confined in transit as hereafter described.

Because of the upward and outward taper of the lower portion of the core of rotor 33, the cylindrical lower portion of stator 21, and the fact that helical ribs or screw flights 37 all extend in close proximity to the inner surface of stator 21, the radially extending distances between the inner surface of stator 21 and the outer surface of the core of rotor 33, in the spaces or grooves between the ribs or screw flights 37, progressively decrease from the lower end of the rotor to intermediate point 25. Hence, the volume defined by each of such grooves or spaces progressively decreases from the bottom to intermediate point 25. From the intermediate point 25 upwardly, the radially extending distances between the inner surface of stator 21 and the outer surface of the core of rotor 33, in the spaces or grooves referred to previously, remain the same because of the complementary taper of both the stator and the core of the rotor. However, because this taper is an outward taper, there exists upwardly from intermediate point 25, a progressive increase in volume defined by the grooves or spaces between the helical ribs or screw flights.

The ribs 37 preferably terminate at their upper end in a portion 40 more vertically disposed relative to the vertical axis of the rotor than the ribs 37, so as to extend substantially longitudinally with respect to the axis of the rotor; and the upper portion of the shell 31, adjacent the vertical portion 40 of the ribs 37, is provided with a plurality of openings 41, the latter providing for discharge from the upper portion of the shell into a chamber 42 formed by the skirt 29 which has the openings 32 and ribs 31.

It will be understood that the rotor 33 is rotated at high speed; and in practice it has been found that satisfactory results may be accomplished by rotating the rotor within a range of 600 to 900 revolutions per minute.

The ore pulp to be treated may be supplied to the lower portion of the chamber 10 by any suitable means such as a feed conduit passageway 43 leading to the bottom reduced portions of the chamber 10 and to the intake of the means 20, as indicated by the arrows 44. As the rotor 33 is rotated by the motor 35, the helical rib projections 37 of the rotor act to induce a flow of the pulp upwardly through the groove space 44' between the shell 21 and rotor 33, and by centrifugal force out through the openings 41 in the top of the shell 21 into the chamber 42 defined by the skirt 29; and the pulp is returned to the chamber 10 by way of the perforations 32 in the skirt 29, and through the bottom openings of the skirt. It is desirable to eliminate turbulence in the pulp adjacent the floating froth, and therefore, the discharge from openings 41 is dispersed as much as possible, to accomplish which the pulp level within the chamber 10 is maintained at a height above the perforations 32 in the skirt 29, which level is indicated at 45.

The terminal vertical portion 40 at the upper end of the rotor directs discharge of the pulp in a radial direction against vertical flanges 31; and such vertical flanges 31 within the skirt 29 operate to interrupt the centrifugal whirling motion of the pulp delivered from the rotor 33 and direct the pulp downwardly into the chamber 42, where it passes into the pulp mass in chamber 10, by way of the perforations 32, and the opening at the bottom of the skirt. However, it will be observed that, with the pulp level at 45, the upward pressure of the mass of the pulp in its tendency to seek its own level 45 will resist free discharge of the pulp from the open bottom of the skirt, and in combination with flanges 31, will cause the evacuated pulp to be largely discharged through openings 32 and thus disperse the discharged pulp fairly evenly into the pulp mass near its top level without appreciably churning the pulp mass close to the surface where the flotation froth is accumulated.

The purpose of the invention being to aerate the pulp for forming a flotation froth, means are provided whereby air may be taken into the voids of the pulp, which means comprises a plurality of vertical slots or openings 46, provided in the walls of the rotor 33. The hollow interior of the rotor 33 is connected to the atmosphere by way of the tubular motor shaft 34, the latter being provided with a suitable valve means 47 disposed in its upper end for regulating the amount of air delivered to the interior of the rotor 33, and consequently the amount of air delivered by way of the slots 46 to the pulp flowing in the space 44'.

In operation, the pulp to be aerated enters the annular passage or space between rotor 33 and stator 21, at the bottom thereof, as indicated by arrows 44. The high speed of rotation of rotor 33 causes the helical screw flights 37 thereon to elevate the pulp mechanically at high velocity; the pulp being discharged through openings 41 in the top of the stator. During such elevation of the pulp at a high velocity, the air passing from within the rotor through slots 46, is subjected to outward forces created by centrifugal action; and the high velocity flow of the pulp creates an aspirator effect. These two actions together cause induction of air into the pulp, through slots 46 of the rotor to thereby effect aeration of the pulp.

It is desirable for best results that the air induced into the pulp be absorbed in an extremely finely divided or attenuated state, or in other words, in small particles. This is so because the air particles are the means for attachment to the mineral particles to be floated. Hence, for a given quantity of air absorbed in the pulp, the smaller the air particles, the greater will be the number thereof available for attachment to the surfaces of the mineral particles, to provide for more efficient flotation. Also, it is desirable to have absorbed in a given quantity of the pulp as large a quantity of air as possible, to provide a maximum source for the formation of the air particles.

The above described desirable results are accomplished in the following manner. During upward travel of the pulp from the bottom of the rotor to intermediate point 25, the progressive decrease in volume defined by the spaces or grooves between screw flights 37 offers a restriction to the flow of pulp to thereby exert a squeezing action on the pulp. Such squeezing action effects, with respect to the mean velocity flow of the pulp, a differential increase in velocity during the lower portion of the pulp's path of travel. This results in extremely fine division or attenuation of the induced air. Such squeezing action, however, does not cause the pulp to flow inwardly through rotor slots 46, because the outward forces created by centrifugal action of the rotor as the pulp is mechanically elevated at a high velocity by positive rotation of screw flights 37 at a high speed, are greater than the forces created by the squeezing action.

Upwardly from point 25, the progressive increase in volume defined by the spaces or grooves between screw flights 37, results in expansion thereof in gradiently increasing volumes, to thereby produce an effect equivalent to that created by a partial vacuum. As a result, absorption of the finely divided air particles is enhanced.

It is to be also understood that for selectively recovering some metals, the amount of aeration may be varied; and when necessary the pulp flowing through the groove space 44' may be subjected to a varied treatment by regulating the amount of air entering the rotor 33 by actuating the valve 47.

Fig. 5 illustrates another embodiment of the invention, wherein the pulp and flotation chamber 10 may be the same as that described above. This embodiment is distinguished from that described in Figs. 1 to 4 inclusive, in that the hollow core of the rotor 33' is cylindrical, and provided with helical rib projections 37'; the depth of groove between which projections progressively decreases in cross section from the bottom of the rotor to substantially an intermediate point 25' within the shell 21'. From the intermediate point 25' upwardly the depth of groove continues with substantially uniform depth in cross section. The shell 21' of this embodiment is substantially inverted from that described in connection with Figs. 1 to 4 inclusive; the lower portion 24' of the shell 21' being flared outwardly and downwardly from substantially an intermediate point 25' of the shell for closely proximate relation with cooperating crest faces of threads 37', so the rotor may be rotated therein; the upper portion 26' of the shell 21' being substantially cylindrical in shape.

The operation of this embodiment subjects the pulp flowing between the rotor and shell to squeezing during the flow up to the intermediate point 25' and thereby effects fine division or attenuation of air in the manner described with reference to Fig. 1. From point 25' upwardly, the volume between the screw flights remains substantially the same. However, expansion of the pulp, to enhance absorption of the air, is effected in the space above the uppermost left hand end of the screw flights 37', as it appears in Fig. 5. Note that such end terminates below the lower edge defining aperture 41'. The air and vacuum means is substantially the same as described in connection with Fig. 1, wherein the air is admitted by way of the valve 47', tubular motor shaft 34' and into the interior of the cylindrical rotor 33'.

Figs. 6 and 7 illustrate still another embodiment of the invention, wherein the shell 21" and core of rotor 33" are both cylindrical in shape, and the rib projections 37" have throughout the length of the rotor, substantially uniform diameter taken perpendicular to the axis of rotation, providing uniform depth of groove between opposing walls of adjacent rib projections 37". The helical screw flights or projections 37" are so arranged as to squeeze the pulp into and through a progressively decreasing volume of groove during its initial flow from the bottom of the rotor to substantially an intermediate point 25", to thereby provide for the results explained above. This is accomplished by progressively upwardly reducing the pitch or lead of the helical rib projections 37" to substantially an intermediate point 25". From point 25" upwardly, expansion of the pulp is effected, to produce the results previously explained with reference to Fig. 1, by progressively increasing the pitch of the helical rib projections 37" to the top of the rotor where the rib may terminate in a more vertical portion as in Fig. 1. This embodiment is further distinguished as a modification in that the annular skirt 29 is eliminated. The cylindrical shell 21" is provided with a plurality of openings 41" through which the aerated pulp is discharged, which openings are provided in the upper portion of the shell 21" and below the pulp level 45 within the chamber 10, so that the bubbles carrying the values may readily rise to form a froth.

Figs. 8 and 9 illustrate still another embodiment of the invention, wherein the flotation chamber may be identical with that described above; this embodiment being distinguished from those above described by having a shell 21ᵃ suspended below the pulp level 45 by suitable arms or legs 50. In this embodiment, both the shell 21ᵃ and rotor 33ᵃ are cylindrical in shape and have opposing walls in spaced relation providing a passageway therebetween; the shell 21ᵃ being perforated at a portion intermediate its ends, as shown at 41ᵃ, and the rotor 33ᵃ being provided with a helical rib projection 37ᵃ adjacent the lower end thereof, and a helical rib projection 37ᵇ adjacent the upper end thereof.

The helical projections 37ᵃ and 37ᵇ are relatively disposed at opposite inclination of pitch; in other words, the helical rib projection 37ᵃ may be described as having a right-hand thread, and the helical projection 37ᵇ as having a left-hand thread; these projections operating to induce a flow of the pulp into their respective ends of the device 20ᵃ, as indicated by the arrows 44ᵃ and 44ᵇ. As the rotor is rapidly rotated the pulp will be caused to flow by propulsion toward the vertical center of the shell and rotor as indicated by the arrows 44ª and 44ᵇ, in the space or passageway formed between the rotor and shell. This action propels the pulp with high velocity into the passageway from both ends toward the vertical central portion and causes a squeezing action at the location where the opposing streams of flow of the pulp meet adjacent openings 41ª, to thereby effect division or attenuation of the induced air.

In this connection, it is to be noted that the pulp will not be forced through slots 40ª because the high speed of rotation of the rotor creates outward centrifugal forces opposing the squeezing action. Rapid extrusion of the pulp through the perforations 41ª creates voids in the pulp mass in transit thus causing it to pick up a generous amount of additional air which, added to the volume of actual pulp, expands it by aeration, so that as the aerated pulp is discharged back into the main body of pulp in the flotation chamber 10, the bubbles, due to aeration, pick up the ore values and float them in a flotation froth.

It can be now understood from the above that each of the embodiments above described operate to induce a high velocity flow of the treated ore pulp through the inner space between the rotor and shell, during which time the pulp is subjected to the force of a crowding pressure or squeezing so that the occluded air is minutely dispersed, and that it is thereafter released so as to disrupt its solidarity of body by velocity and thereby create added voids therein which pick up or accumulate air and thus expand the pulp in transit by the extent of aeration thereof. The pulp expanded by aeration is returned to the pulp mass, by way of the openings in the shell. This aerated and expanded pulp coming in contact with the pulp in the chamber 10 forms bubbles which accumulate ore values in a froth above the level of the pulp, which froth then contains the selected values desired, it being well known in the flotation art that by selective use of chemicals, gases and the like, selective ore values may be recovered. The level of the froth formed above the pulp level may be regulated by the gate 16'; and when the froth accumulates above this level, it overflows over the gate 16', being partially actuated by the incline of rear wall 13 toward the gate, and is thereafter collected for such further treatment as may be required. Since it is desirable that the pulp at its level 45 be maintained as quiescent as possible, so as not to agitate the froth, the aerated pulp is dispersed into the pulp mass in chamber 10 over as large an area as possible.

While I have illustrated and described but certain embodiments of the invention, it will be apparent to those skilled in the art that certain changes, modifications, substitutions, additions and omissions may be made in the structures herein described without departing from the spirit and scope of the invention, as defined by the appended claims.

I claim:—

1. In a flotation apparatus which includes means for introducing air into a body of pulp in transit, a flotation chamber for receiving a body of pulp, and means communicating with said chamber adapted for conveying pulp, said last mentioned means including a shell, a core, and means operatively between the shell and core for subjecting pulp in transit to squeezing pressure, said shell and core having relative rotation one to the other.

2. A flotation apparatus comprising a shell, a rotor within said shell defining a passageway therebetween, said passageway having an inlet and an outlet for the flow of pulp, means providing for passage of air into said passageway, and helical screw flights on said rotor to elevate said pulp from said inlet to said outlet upon rotation of said rotor, a portion of said screw flights being arranged to cooperate with said shell so as to exert a squeezing action on the pulp to thereby effect increase in velocity of the pulp.

3. A flotation apparatus comprising a shell, a rotor within said shell defining a passageway therebetween, said passageway having an inlet and an outlet for the flow of pulp, means providing for passage of air into said passageway, and helical screw flights on said rotor to elevate said pulp from said inlet to said outlet upon rotation of said rotor, a portion of said screw flights being arranged to cooperate with said shell so as to exert a squeezing action on the pulp to thereby effect increase in velocity of the pulp and attenuation of the air, and a portion of said screw flights being arranged to cooperate with said shell so as to effect expansion of said pulp and absorption of the air.

4. A flotation apparatus comprising a shell, a rotor within said shell defining a passageway therebetween, said passageway having an inlet and an outlet for the flow of pulp, means providing for passage of air into said passageway, and helical screw flights on said rotor to elevate said pulp from said inlet to said outlet upon rotation of said rotor, a portion of said screw flights being arranged to cooperate with said shell so as to exert a squeezing action on the pulp to thereby effect increase in velocity of the pulp, and a portion of said screw flights being of increasing pitch to effect expansion of said pulp.

5. In a flotation apparatus, a substantially cylindrical shell, a substantially cylindrically shaped rotor within said shell defining a passageway therebetween, said passageway having an inlet and an outlet for the flow of pulp, means providing for passage of air into said passageway, and helical screw flights on said rotor having an increasing pitch to effect expansion of pulp flowing through said passageway.

6. In a flotation apparatus, a substantially cylindrical shell, a substantially cylindrically shaped rotor within said shell defining a passageway therebetween, said passageway having an inlet and an outlet for the flow of pulp, means providing for passage of air into said passageway, helical screw flights on said rotor having an increasing pitch, and a flange on said rotor adjacent said outlet and extending substantially longitudinally with respect to the axis of said rotor.

7. In a flotation apparatus, a shell, a rotor within said shell defining a passageway therebetween, said passageway having an inlet and an outlet for the flow of pulp, means providing for passage of air into said passageway, and helical screw flights on said rotor, said screw flights terminating adjacent said outlet in a flange extending substantially longitudinally with respect to the axis of said rotor.

MAX KRAUT.